US012544723B1

(12) United States Patent
Pamplin et al.

(10) Patent No.: US 12,544,723 B1
(45) Date of Patent: Feb. 10, 2026

(54) USER INTERFACE FOR PORTABLE CARBONATION DEVICE

(71) Applicant: MavorCo Operations LLC, New York, NY (US)

(72) Inventors: Ryan Michael Pamplin, San Juan, PR (US); William Faxon Gordon, Petaluma, CA (US); Nicholas Isaac Reid, San Francisco, CA (US); Jeremy Galten, Petaluma, CA (US); Jeff Davies, Windsor, CA (US)

(73) Assignee: MavorCo Operations LLC, New York, NY (US)

( * ) Notice: Subject to any disclaimer, the term of this patent is extended or adjusted under 35 U.S.C. 154(b) by 154 days.

(21) Appl. No.: 18/605,611

(22) Filed: Mar. 14, 2024

(51) Int. Cl.
  *B67D 1/04* (2006.01)
  *B01F 23/2361* (2022.01)
  *B01F 23/237* (2022.01)

(52) U.S. Cl.
  CPC .......... *B01F 23/237621* (2022.01); *B01F 23/23611* (2022.01); *B67D 1/0412* (2013.01)

(58) Field of Classification Search
  CPC ....... B01F 23/237621; B01F 23/23611; B67D 1/0412
  See application file for complete search history.

(56) References Cited

U.S. PATENT DOCUMENTS

| | | | |
|---|---|---|---|
| 10,889,424 B1* | 1/2021 | Lyons | B65D 83/06 |
| 11,758,930 B1* | 9/2023 | Pamplin | A23L 2/40 |
| | | | 426/477 |
| 11,840,439 B1* | 12/2023 | Pamplin | B67C 3/22 |
| 2014/0070431 A1* | 3/2014 | Hatherell | B65D 85/73 |
| | | | 261/37 |
| 2015/0125578 A1* | 5/2015 | Hatherell | B65D 1/06 |
| | | | 426/232 |
| 2017/0341039 A1* | 11/2017 | Minakawa | B01F 23/2368 |
| 2019/0015797 A1* | 1/2019 | Asis | A23L 2/54 |
| 2020/0156019 A1* | 5/2020 | Sawyer | B01F 23/2361 |
| 2023/0406611 A1* | 12/2023 | Käser | B01F 35/602 |

* cited by examiner

*Primary Examiner* — Frederick C Nicolas
(74) *Attorney, Agent, or Firm* — Esplin & Associates, PC

(57) ABSTRACT

A portable carbonation system and a method for producing a carbonated beverage from a primary liquid through at least one chemical reaction are disclosed. Exemplary implementations may include a base assembly, a beverage chamber, a control interface, and/or other components. The base assembly includes a cavity to hold reactants, a liquid reservoir, a reservoir fill valve, a reservoir drain valve, and/or other components. Operations are triggered by and/or responsive to (mechanical) manipulation of the control interface. The reservoir fill valve controls fluid communication to the liquid reservoir. The reservoir drain valve controls fluid communication from the liquid reservoir to the cavity, which initiates a chemical reaction. Gas generated by the chemical reaction travels to the beverage chamber and produces the carbonated beverage.

20 Claims, 7 Drawing Sheets

USER INTERFACE FOR PORTABLE CARBONATION DEVICE

FIELD OF THE DISCLOSURE

The present disclosure relates to a user interface for a portable carbonation device, and, in particular, for a portable carbonation device or system using reactants to carbonate a beverage.

BACKGROUND

Carbonated liquids are common and known, including but not limited to carbonated water and other drinks. Different mechanisms are known to carbonate a beverage, including but not limited to consumer appliances that can carbonate beverages in their drinking bottles, typically using a gas canister.

SUMMARY

One aspect of the present disclosure relates to a portable carbonation device or system configured to produce a carbonated beverage from a primary liquid through at least one chemical reaction. As used herein, both liquids and gases, including carbon dioxide ($CO_2$), may be referred to as fluids. The produced carbonated beverage may include, but is not limited to, carbon dioxide, or combinations that include carbon dioxide. The carbon dioxide may carbonate the beverage held in the portable carbonation system (particularly, within a container body of the portable carbonation system). The portable carbonation system may be portable due to its size. A user can take the portable carbonation system anywhere and create and enjoy carbonated beverages, including but not limited to water and other drinks. For example, disclosure regarding the portable carbonation device or system may be found in U.S. patent application Ser. No. 18/147,980, entitled "PORTABLE CARBONATION DEVICE," and filed Dec. 29, 2022, which is hereby incorporated into the present disclosure in its entirety.

The portable carbonation system may include a base assembly, a beverage chamber, a control interface, and/or other components. The base assembly includes a cavity to hold reactants, a liquid reservoir, a reservoir fill valve, a reservoir drain valve, and/or other components. Operations are triggered by and/or responsive to (mechanical) manipulation of the control interface. The reservoir fill valve controls fluid communication to the liquid reservoir. The reservoir drain valve controls fluid communication from the liquid reservoir to the cavity, which initiates a chemical reaction. Gas generated by the chemical reaction travels to the beverage chamber and produces the carbonated beverage.

Another aspect of the present disclosure is a method of producing a carbonated beverage from a primary liquid through at least one chemical reaction. The method may include receiving the primary liquid to fill the beverage chamber. The method may include communicating fluidly the primary liquid from the beverage chamber to the liquid reservoir via the reservoir fill valve. The method may include receiving the input from the user via the control interface to initiate at least one chemical reaction. The method may include communicating fluidly the primary liquid from the liquid reservoir to the reactant cavities. The method may include receiving, at the one or more reactant cavities, the primary liquid from the liquid reservoir, such that the primary liquid at the one or more reactant cavities initiates the at least one chemical reaction. The at least one chemical reaction generates a gas from the one or more reactants and water in the primary liquid. The method may include fluidly communicating the gas via a pathway from the one or more reactant cavities to the primary liquid held in the beverage chamber. The method may include receiving the gas within the beverage chamber that contains the primary liquid, such that the gas within the beverage chamber produces the carbonated beverage in the beverage chamber. The method may include other steps.

As used herein, any association (or relation, or reflection, or indication, or correspondency) involving assemblies, containers, reagents, reactants, cavities, user interfaces, conduits, valves, and/or another entity or object that interacts with any part of the portable carbonation system and/or plays a part in the operation of the portable carbonation system, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof. As used herein, the term "carbonate" may be used to refer to dissolving carbon dioxide and/or another gas in a fluid.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
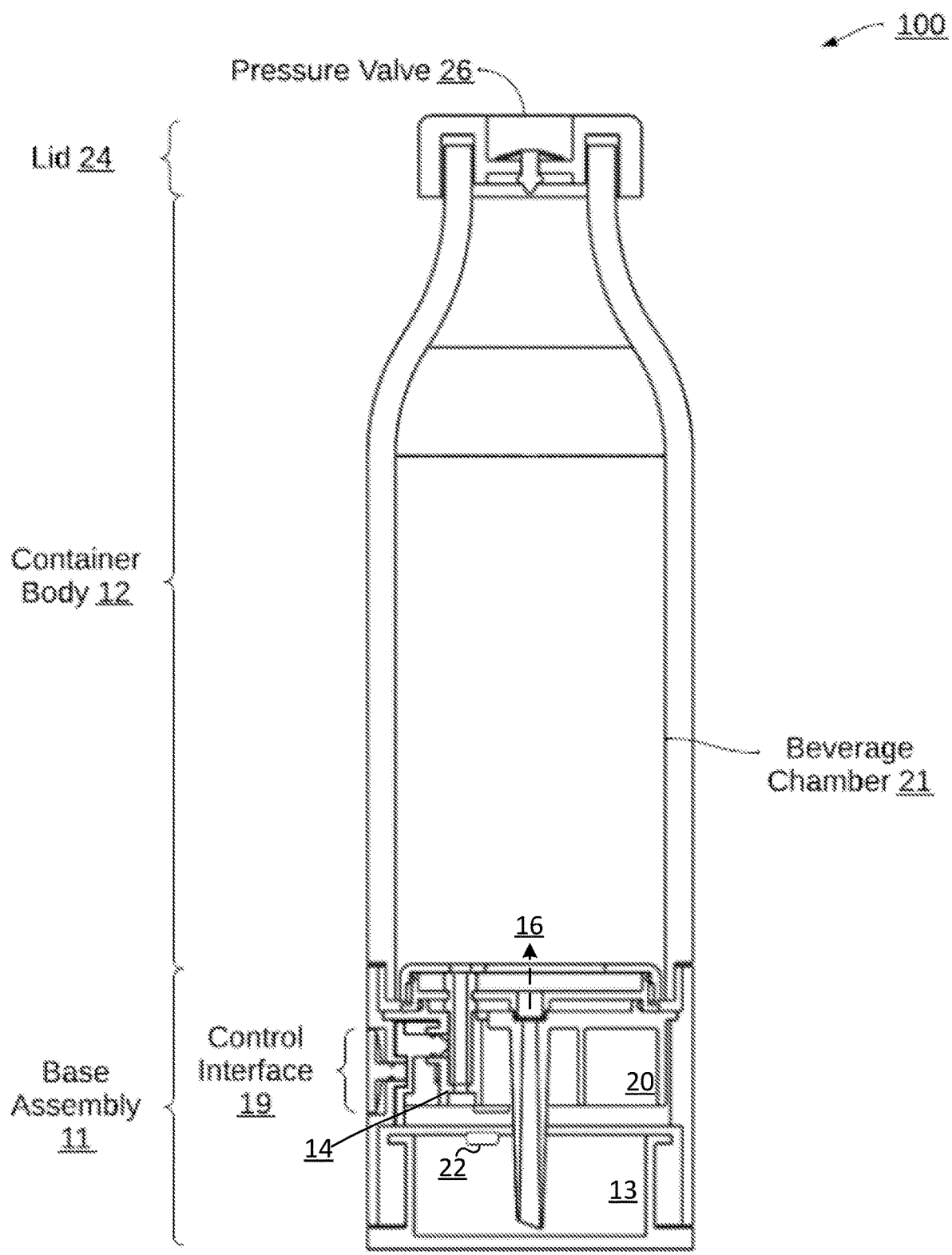
FIG. 1 shows a cross-sectional view of a portable carbonation system, in accordance with one or more implementations.
Figure 2:
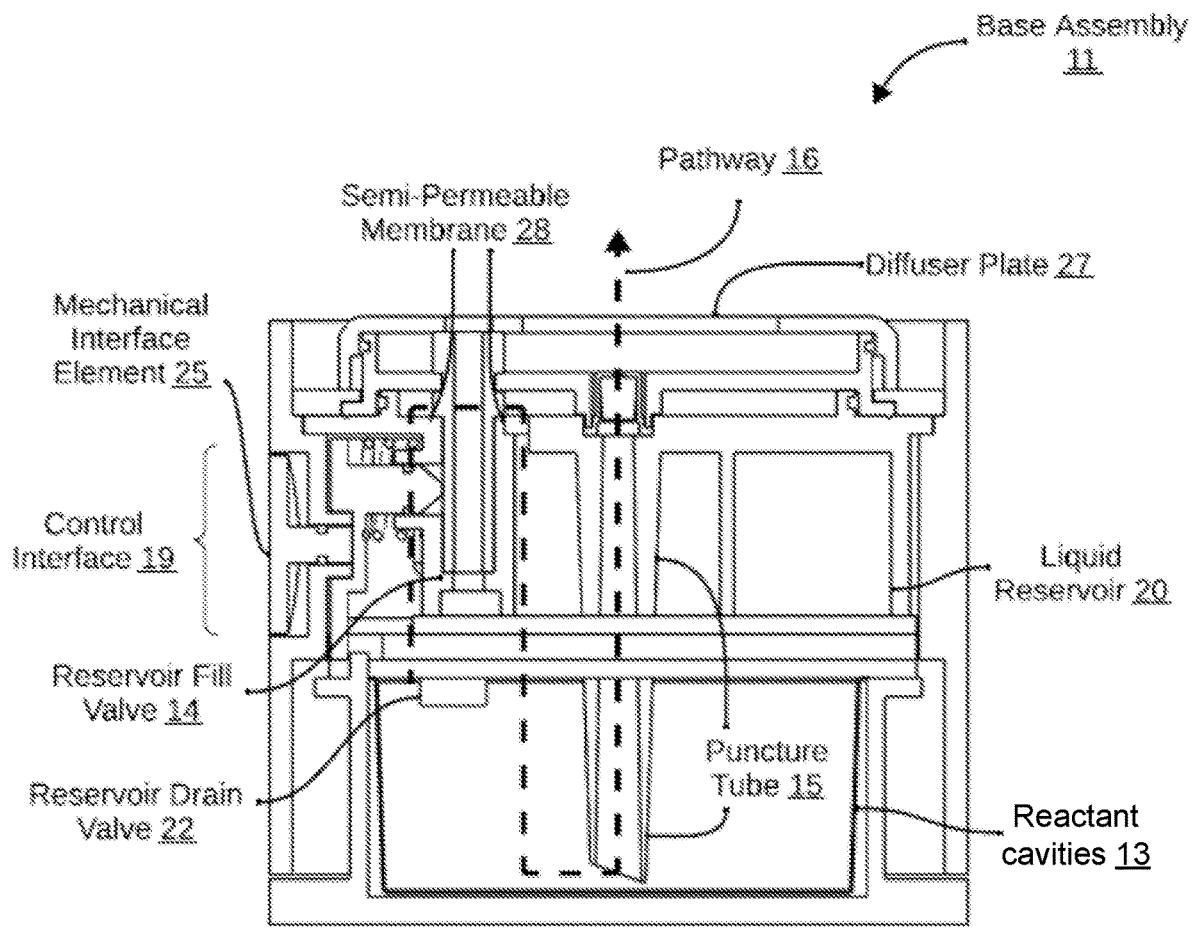
FIG. 2 shows a cross-sectional view of a base assembly as used in a portable carbonation system, in accordance with one or more implementations.
Figure 4:
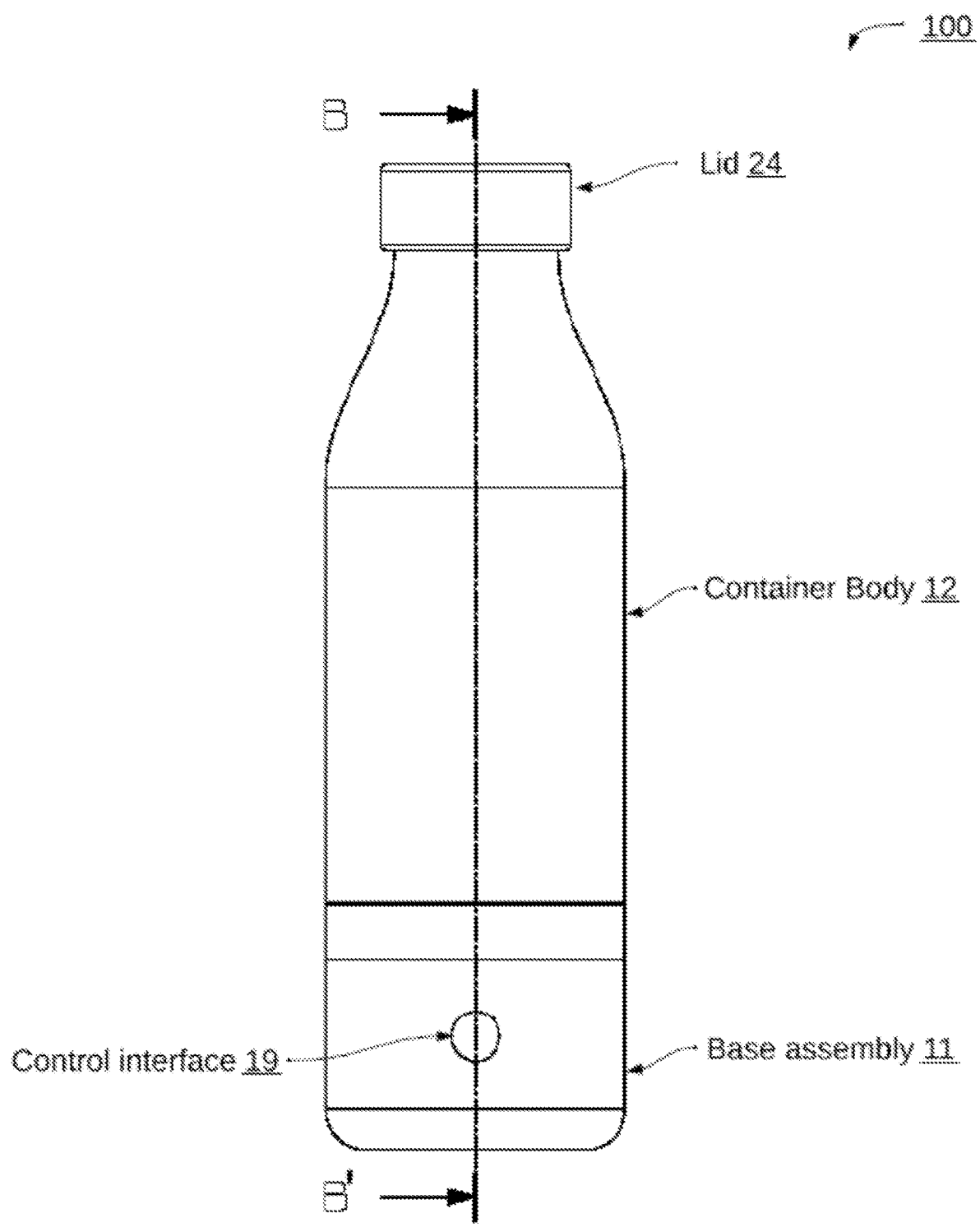
FIG. 4 shows a front view of a portable carbonation system, in accordance with one or more implementations.

FIG. 1 shows a cross-sectional view of a portable carbonation system 100, in accordance with one or more implementations. Portable carbonation system 100 may be referred to as (portable) carbonation device 100. Portable carbonation system 100 may include a base assembly 11, a container body 12, and a lid 24 assembled together. FIG. 2 shows a cross-sectional view of base assembly 11. By way of non-limiting example, FIG. 4 shows a front view of portable carbonation system 100 with base assembly 11, container body 12, and lid 24 assembled together. The centerline B-B' in FIG. 4 may indicate the cross-section that is depicted in FIG. 1 (showing a cross-sectional view of portable carbonation system 100) and FIG. 2 (showing a cross-sectional view of base assembly 11). In some implementations, portable carbonation system 100 may include additional elements not readily shown in FIG. 1.

Referring to FIG. 1, container body 12 may extend from a proximal end to a distal end. In some implementations, the proximal end may be located at or near base assembly 11. The distal end may be located opposite the proximal end. In some implementations, container body 12 may have a longitudinal axis extending through the proximal end and the distal end. Container body 12 may form a beverage chamber 21 having a chamber opening, e.g., at the distal end of the container. The chamber opening may be configured to receive the primary liquid to fill beverage chamber 21 prior to production of the carbonated beverage. The chamber opening may be configured to facilitate passage therethrough of the carbonated beverage for consumption subsequent to production of the carbonated beverage.

Figure 5:
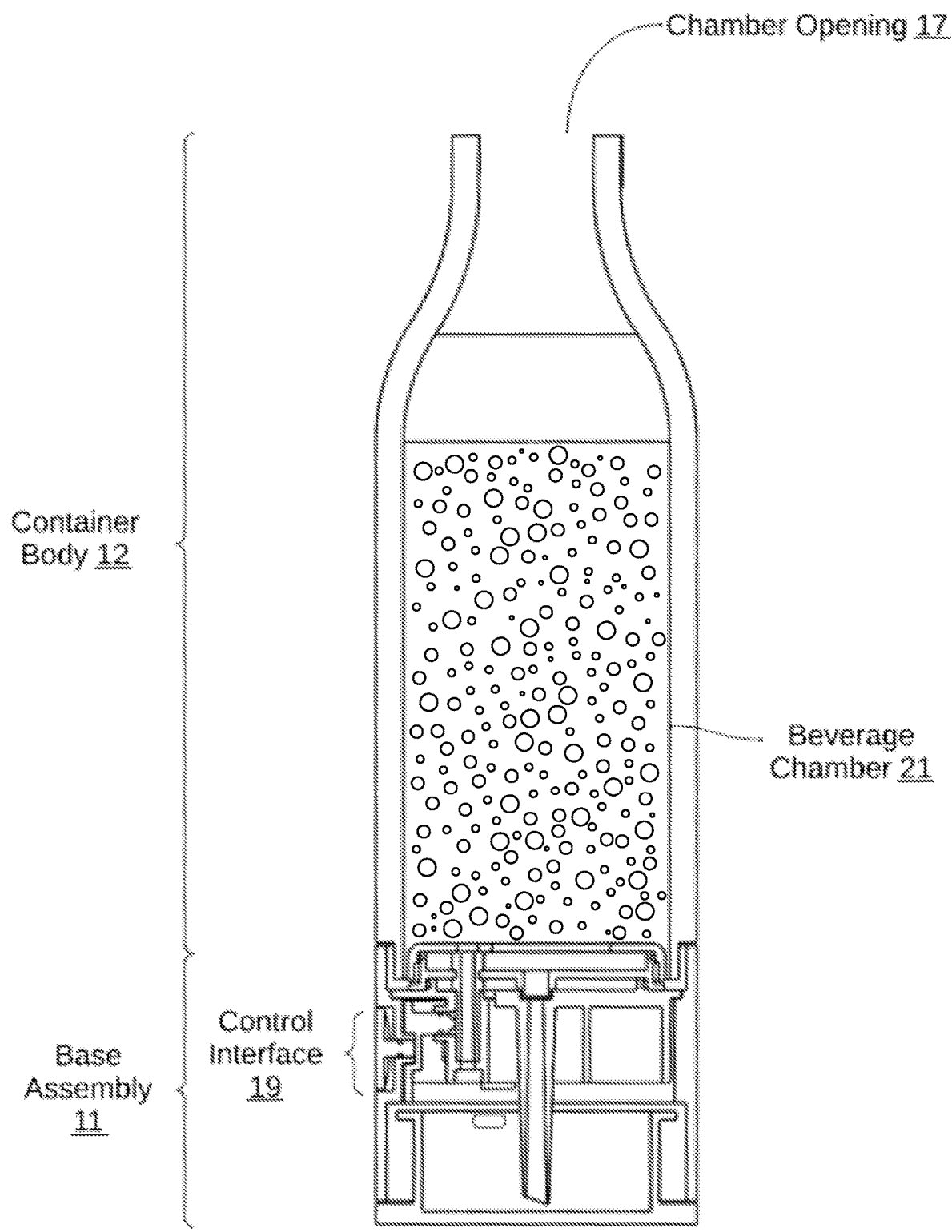
FIG. 5 shows a cross-sectional view of a portable carbonation system, in accordance with one or more implementations.

In some implementations, the chamber opening may be revealed and/or made available for use upon removal and/or manipulation of lid 24. In some implementations, lid 24 may be removably engaged with container body 12. For example, lid 24 may be configured to removably engage with the base assembly through one or more couplings. By way of non-limiting example, the chamber opening may be revealed by virtue of a user unscrewing lid 24, a user flipping open lid 24 (e.g., in implementations where lid 24 is hinged), a user lifting off lid 24, and/or through other methods. For example, removing and/or manipulating lid 24 may create an opening at the distal end of container body 12, e.g., for drinking. For example, FIG. 5 shows a cross-sectional view of portable carbonation system 100. As depicted in FIG. 5, lid 24 (shown in FIG. 1 and described herein) may have been removed. As such, a chamber opening 17 may be revealed and/or made accessible to a user.

In some implementations, lid 24 may include a pressure valve 26. Pressure valve 26 may be configured to control pressure within beverage chamber 21. For example, pressure valve 26 may be configured to facilitate fluid communication of gas out of beverage chamber 21. In some implementations, the fluid communication of the gas may be facilitated responsive to pressure within beverage chamber 21 surpassing a threshold value. By way of non-limiting example, pressure within beverage chamber 21 may surpass the threshold value during and/or after carbonation of the primary liquid. By way of non-limiting example, pressure within beverage chamber 21 may result in pressure valve 26 facilitating fluid communication, e.g., of gas.

Referring back to FIG. 1, container body 12 may be configured to hold a volume of a primary liquid. The primary liquid may be a beverage and/or another fluid, including but not limited to potable liquid such as water. In some cases, the primary liquid may include water. The primary liquid may or may not be carbonated. In some implementations, the volume of container body 12 may range between 12 and 64 ounces, between 14 and 48 ounces, between 16 and 36 ounces, and/or another range. In some implementations, container body 12 may have a cylindrical shape. For example, horizontal cross-sections of container body 12 may have a circular shape. In some implementations, container body 12 may have a diameter ranging between 2 and 8 inches, between 3 and 7 inches, between 4 and 6 inches, and/or another range. In some implementations, carbonation is performed such that the beverage held in container body 12 includes about 2-5 grams of carbonic acid ($H_2CO_3$) per liter, about 3-4 grams of carbonic acid ($H_2CO_3$) per liter, and/or another amount or range of grams of carbonic acid ($H_2CO_3$) per liter, subsequent to carbonation by portable carbonation system 100.

In some implementations, base assembly 11 may have a cylindrical shape. For example, horizontal cross-sections of base 11 may have a circular shape. In some implementations, the cylindrical shape of base 11 may have a diameter between 2 and 6 inches, which may be referred to as a base diameter. In some implementations, the cylindrical shape of base 11 may have a base diameter between 3 and 5 inches, between 3.5 and 4.5 inches, and/or another range of diameters. The base diameter may improve portability, as well as allow portable carbonation system 100 to be stored in a cup holder, e.g., in a vehicle.

In some implementations, container body 12 may be configured to removably engage with base assembly 11 through one or more couplings. For example, container body 12 may be configured to be twisted onto and/or untwisted from base assembly 11 (e.g., using threaded couplings). In some implementations, base assembly 11 may couple with container body 12 using one or more (mechanical) couplings, such that base assembly 11 and container body 12 snap, click, screw, and/or otherwise removably engage with each other. The one or more couplings may be included in both base assembly 11 and container body 12. By way of non-limiting example, the one or more couplings may include threaded couplings. In some implementations, the threaded couplings may need to be tightened sufficiently for proper operation of portable carbonation system 100.

In some implementations, portable carbonation system 100 may be configured to be manipulated such that access to one or more reactants, one or more byproducts of at least one chemical reaction, and/or other material is provided, e.g., for manual removal. By way of non-limiting example, such manipulation may include disengaging base assembly 11 and container body 12 from each other. In some implementations, upon disengaging base assembly 11 and container body 12, a user may be enabled to remove one or more reactants from a reactant cavity 13 (shown in FIG. 2 and described herein). By way of non-limiting example, such manipulation of portable carbonation system 100 may effectuate a reset of portable carbonation system 100. In some implementations, the reset may include movement of a mechanical interface element (e.g., mechanical interface element 25 shown in FIG. 2 and described herein) to a particular position, e.g., a ready position. In some implementations, movement of mechanical interface element 25 upon disengaging base assembly 11 and container body 12 may be powered by a spring. As used herein, any reference to "reactant cavity 13" may be used to refer to one or more reactant cavities.

Referring to FIG. 2, base assembly 11 may be configured to rest on a generally horizontal surface during production of the carbonated beverage. Base assembly 11 may include one or more reactant cavities 13, a reservoir fill valve 14, a puncture tube 15, a control interface 19, a liquid reservoir 20, a reservoir drain valve 22, and/or other components. In some implementations, control interface 19 may be configured to receive user input from a user to initiate at least one chemical reaction to produce the carbonated beverage. Control interface 19 may include a mechanical interface element 25 that is movable between a ready position, an engaged position, and/or other positions. By way of non-limiting example, mechanical interface element 25 may be a button, a knob, a dial, a lever, a switch, and/or another element. For example, moving a button to an engaged position may include pressing the button. For example, moving a switch, a lever, and/or another element to an engaged position may include flipping and/or placing the switch, the lever, and/or the other element to and/or in the engaged position.

In some implementations, moving mechanical interface element 25 to the engaged position may initiate carbonation of the beverage for a carbonation duration. In some implementations, responsive to receipt of user input, mechanical interface element 25 may be moved to the engaged position. In some implementations, control interface 19 may warn the user when the threaded couplings are not tightened sufficiently for proper operation. For example, control interface 19 may use one or more lights and/or sounds to warn the users the threaded couplings are not tightened. For example, mechanical interface element 25 may be prevented from being moved to the engaged position when the threaded couplings are not tightened sufficiently.

By way of non-limiting example, mechanical interface element 25 may be a button. In such an example, moving mechanical interface element 25 to the engaged position may include pressing mechanical interface element 25 for a press duration. In some cases, the carbonation duration may last longer than the press duration. In some implementations, the carbonation duration may be about 30 seconds, about 1 minute, about 2 minutes, about 3 minutes, between 1 and 3 minutes, between 2 and 4 minutes, less than 2 minutes, less than 10 minutes, and/or another duration. In some cases, the press duration may last longer than the carbonation duration. In some cases, briefly pressing mechanical interface element 25 may cause mechanical interface element 25 to remain in the engaged position until base assembly 11 and container body 12 are disengaged. In some implementations, mechanical interface element 25 may move from the engaged position to the ready position upon receiving additional user input. Various operations in portable carbonation system 100 may be triggered by and/or responsive to receipt of user input. For example, operations of valves in portable carbonation system 100 may be triggered by and/or responsive to manipulation of control interface 19.

By way of non-limiting example, the carbonation duration may be a duration of time from the user input being received until (sufficient completion of) carbonation of the primary liquid in a beverage chamber (e.g., beverage chamber 21 shown in FIG. 1 and described herein). In some implementations, the carbonation duration may be a duration of time from the user input being received until (sufficient) completion of at least one chemical reaction. In some implementations, mechanical interface element 25 may be configured to remain in the engaged position for at least the carbonation duration. In some implementations, mechanical interface element 25 may be configured to remain in the engaged position for a particular duration that is shorter than the carbonation duration. In some implementations, mechanical interface element 25 may be configured to effectuate mechanical manipulation of one or more of reservoir fill valve 14, reservoir drain valve 22, and/or other elements of portable carbonation system 100.

In some implementations, control interface 19 may be configured to facilitate transitions between different modes of operation of portable carbonation system 100. In some implementations, the different modes could include, by way of non-limiting example, "carbonating" and "not carbonating". In some implementations, the different modes could include "enabling fluid communication through reservoir fill valve 14" and "restricting fluid communication through reservoir fill valve 14". In some implementations, the different modes could include "ready to carbonate" and "ready to drink". In some implementations, the different modes could include "enabling fluid communication through reservoir drain valve 22" and "restricting fluid communication through reservoir drain valve 22." Combinations of these modes are envisioned within the scope of this disclosure. Sequences of these modes, transitioning from mode to mode, are envisioned within the scope of this disclosure.

In some implementations, portable carbonation system 100 may be configured to operate in at least two different modes of operation, including a ready-for-carbonation mode of operation and at least one carbonation mode of operation. Portable carbonation system 100 may transition between different modes of operation, e.g., responsive to receiving user input through control interface. For example, in the ready-for-carbonation mode of operation, reactant cavity 13 may hold one or more reactants and base assembly 11 may be coupled to container body 12. For example, in at least one carbonation mode of operation, carbon dioxide may be produced (through interaction between reactants and water). The produced carbon dioxide may carbonate the primary liquid in beverage chamber 21, thereby creating a chemical solution including the carbon dioxide and the beverage.

In some implementations, reactant cavity 13, liquid reservoir 20, and/or other components may be formed by base assembly 11. In some implementations, base assembly 11 may include one or more reactant cavities. The one or more reactant cavities may include reactant cavity 13. Reactant cavity 13 may be configured to hold reactant(s) inertly prior to initiation of at least one chemical reaction. By way of non-limiting example, reactant cavity 13 may be configured to hold one or more reactants inertly prior to initiation of at least one chemical reaction. By way of non-limiting example, reactant cavity 13 may include a cavity configured to accommodate a receptacle or container containing one or more reactants. In some implementations, the reactants may include at least one (chemical) base and at least one acid. By way of non-limiting example, the base may include ammonium bicarbonate, sodium bicarbonate, and/or other (food-safe) bases. By way of non-limiting example, the acid may include malic acid, citric acid, and/or other (food-safe) acids. In some cases, one or more reactants may be in fluid form.

By way of non-limiting example, one or more reactants may be in the form of a tablet, a capsule, a pod, a powder, a gel, a solid, a liquid, and/or another form, as well as combinations thereof. By way of non-limiting example, the one or more reactants may be compressed to form a cylinder, a disk, a donut, a torus, a puck, and/or another shape. In some implementations, one or more reactants may be in (compressed) powder form, or solid form. In some implementations, the one or more reactants may be held by a container, a receptacle, and/or another structure. By way of non-limiting example, the container may be made of one or more of paper, plastic, foil, metal, and/or another material or combination of materials. The container may be a single-use container and/or a reusable container. In some cases, one or more of the reactants may be held together by a mesh or a film, such as a (dissolvable) film. By way of non-limiting example, the container may include a puncturable cover (e.g., paper, soft plastic, foil, etc.). For example, one or more of puncture tube 15, reservoir drain valve 22, and/or other components may puncture the puncturable cover. In some implementations, individual ones of such components may puncture a puncturable cover upon base assembly 11 being coupled with container body 12 (shown in FIG. 1 and described herein), upon receipt of user input via control interface 19, and/or upon other changes to portable carbonation system 100 (shown in FIG. 1 and described herein). Puncture tube 15 puncturing the puncturable cover may enable fluid communication of one or more products and/or another material from reactant cavity 13. By way of non-limiting example, puncture tube 15 may have a slanted tip to better enable puncture tube 15 to puncture the puncturable cover. Reservoir drain valve 22 puncturing the puncturable cover may enable fluid communication of the primary liquid to reactant cavity 13. The one or more bases and the one or more acids may, upon contact and/or other interaction with a fluid, initiate at least one chemical reaction. By way of non-limiting example, the fluid may include water.

Reservoir fill valve 14 may controllably provide fluid communication from a beverage chamber (e.g., beverage chamber 21 shown in FIG. 1 and described herein) to liquid reservoir 20. By way of non-limiting example, upon introduction of the primary liquid to the beverage chamber, a portion of the primary liquid may be communicated to liquid reservoir 20. As such, reservoir fill valve 14 may enable liquid reservoir 20 to be filled with contents of the beverage chamber. In some implementations, while mechanical interface element 25 is in the ready position, the fluid communication from the beverage chamber to liquid reservoir 20 may be enabled via reservoir fill valve 14. In some implementations, the fluid communication from the beverage chamber to liquid reservoir 20 may be powered at least in part by gravity when the base assembly is at rest on a generally horizontal surface (e.g., as depicted in FIG. 1). In some implementations, operations of reservoir fill valve 14 may be triggered by and/or responsive to receipt of user input, including but not limited to manipulation of control interface 19.

By way of non-limiting example, responsive to receipt of user input via control interface 19, reservoir fill valve 14 may be configured to restrict fluid communication between liquid reservoir 20 and reactant cavity 13. Such restriction may disable fluid communication from liquid reservoir 20 to reactant cavity 13. By way of non-limiting example, restricting the fluid communication between liquid reservoir 20 and reactant cavity 13 may enable control of the volume of a portion of the primary liquid used for at least one chemical reaction. By way of non-limiting example, restricting the fluid communication between liquid reservoir 20 and reactant cavity 13 may enable control and/or timing of (initiation of) at least one chemical reaction. In some implementations, mechanical interface element 25 may be configured to effectuate mechanical manipulation of reservoir fill valve 14 responsive to the receipt of the user input via control interface 19. By way of non-limiting example, the user input may include moving mechanical interface element 25 to the engaged position. For example, such mechanical manipulation of reservoir fill valve 14 may restrict fluid communication from the beverage chamber to liquid reservoir 20. In some implementations, reservoir fill valve 14 may be or include a tube of silicon and/or other pliable material that can be pinched shut to restrict fluid communication. In some implementations, reservoir fill valve 14 may include one or more angled ramps that translate horizontal motion of mechanical interface element 25 into vertical motion to restrict fluid communication.

Reservoir drain valve 22 may controllably provide fluid communication from liquid reservoir 20 to reactant cavity 13. By way of non-limiting example, responsive to receipt of user input via control interface 19, the primary liquid in liquid reservoir 20 may be communicated fluidly to reactant cavity 13. In some implementations, the user input may be to initiate at least one chemical reaction. By way of non-limiting example, the user input may include moving mechanical interface element 25 to the engaged position. Mechanical interface element 25 may be configured to effectuate mechanical manipulation of reservoir drain valve 22 responsive to the receipt of the user input via control interface 19. Such mechanical manipulation of the reservoir may result in the primary liquid in liquid reservoir 20 being communicated fluidly to reactant cavity 13. In some implementations, fluid communication of the primary liquid to reactant cavity 13 may initiate at least one chemical reaction. In some implementations, fluid communication from liquid reservoir 20 to reactant cavity 13 may be powered at least in part by gravity when the base assembly is at rest on a generally horizontal surface. In some implementations, operations of reservoir drain valve 22 may be triggered by and/or responsive to receipt of user input, including but not limited to manipulation of control interface 19. In some implementations, reservoir drain valve 22 may be or include a tube of silicon and/or other pliable material that can be pinched shut to restrict fluid communication. In some implementations, reservoir fill valve 14 may include a poppet valve actuated by user input to enable fluid communication.

In some implementations, at least one chemical reaction may generate and/or produce one or more products. In some implementations, one or more reactant cavities 13 may include a particular cavity configured to hold one or more byproducts of the chemical reaction (which are not communicated to beverage chamber 21). By way of non-limiting example, the one or more products may include one or more of carbon dioxide, nitrogen, water, a salt, and/or other products. In some implementations, one or more of carbon dioxide, nitrogen, and/or another product of at least one chemical reaction may be suitable for carbonation of a beverage. By way of non-limiting example, the carbon dioxide may be carbon dioxide gas used for carbonation of the primary liquid. At least one chemical reaction may produce carbon dioxide (or nitrogen) from the base, the acid, water, and/or other reactants. In some implementations, at least one chemical reaction may produce and/or generate one or more liquids from the base reactant, the acid reactant, and water in one or more reactant cavities.

In some implementations, base assembly 11 may form a pathway 16. Pathway 16 may facilitate fluid communication from reactant cavity 13 to beverage chamber 21 to release one or more particular products of at least one chemical reaction into the primary liquid held in beverage chamber 21. The one or more particular products may include carbon dioxide gas. Such release in beverage chamber 21 may produce the carbonated beverage in beverage chamber 21. In some implementations, pathway 16 may traverse a semi-permeable membrane 28. By way of non-limiting example, semi-permeable membrane 28 may be configured to facilitate passage of gas generated by at least one chemical reaction therethrough. Semi-permeable membrane 28 may be located at multiple locations and/or traversed one or more times along pathway 16. By way of non-limiting example, semi-permeable membrane 28 may be located at any point along pathway 16. In some implementations, liquids may be incapable of permeating semi-permeable membrane 28. By way of non-limiting example, semi-permeable membrane 28 may only be permeable to gases. In some implementations, semi-permeable membrane 28 may facilitate passage of particular fluids in one direction. For example, the one direction through semi-permeable membrane 28 may be toward the beverage chamber along pathway 16. In some implementations, pathway 16 may include one or more conduits.

In some implementations, pathway 16 may traverse puncture tube 15. By way of non-limiting example, puncture tube 15 may be configured to provide fluid communication from reactant cavity 13 to beverage chamber 21. In some implementations, puncture tube 15 may provide direct fluid communication from reactant cavity 13 to beverage chamber 21. In some implementations, one or more other materials may be communicated from reactant cavity 13 to beverage chamber 21 via puncture tube 15. In some implementations, the one or more particular products may move along pathway 16 powered at least in part by pressure build up from at least one chemical reaction.

In some implementations, base assembly 11 may include a diffuser plate 27. In some implementations, diffuser plate 27 may be configured to separate the carbon dioxide gas into smaller portions. By way of non-limiting example, separating the carbon dioxide gas into smaller portions may enable more efficient and/or preferable carbonation of the primary liquid. In some implementations, pathway 16 may traverse diffuser plate 27. By way of non-limiting example, diffuser plate 27 may be a final step along pathway 16 prior to release of the one or more particular products and/or the one or more other materials into beverage chamber 21.

Figure 3A:
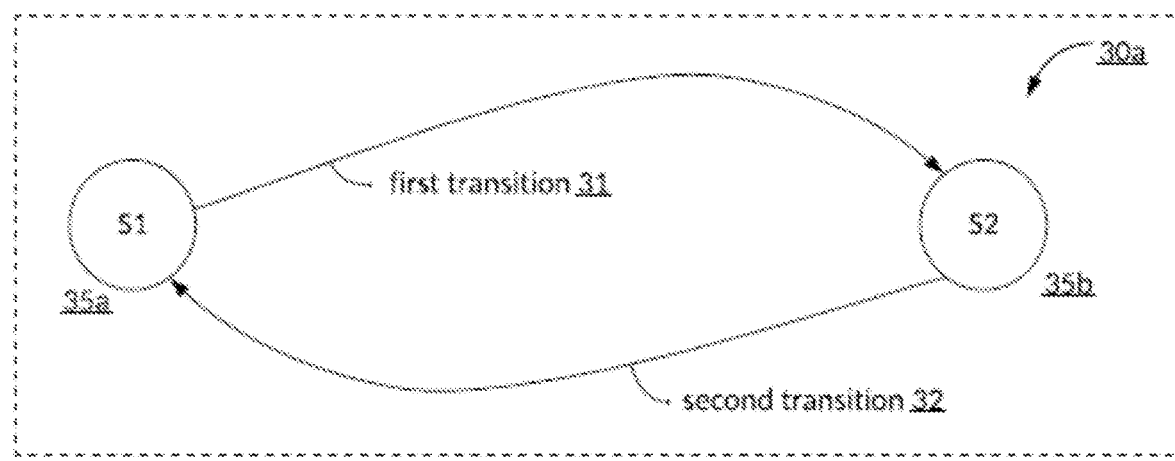
FIGS. 3A-3B-3C-3D illustrate state transitions in state diagrams as may be used by a portable carbonation system, in accordance with one or more implementations.

By way of non-limiting example, FIG. 3A illustrates state transitions in a state diagram 30*a* as may be used by portable carbonation system 100 (shown in at least FIG. 1). For example, FIG. 3A may represent state transitions as may be used by portable carbonation system 100 responsive to different types of detections regarding control interface 19 being manipulated by a user as described elsewhere in this disclosure. As depicted, state diagram 30*a* may include a first state 35*a* (labeled "S1") and a second state 35*b* (labeled "S2"). First state 35*a* may correspond to a ready-for-carbonation mode of portable carbonation system 100 (shown in at least FIG. 1). Second state 35*b* may correspond to a first carbonation mode of operation of portable carbonation system 100. As depicted here, a first transition 31 may transition the mode of operation of portable carbonation system 100 from first state 35*a* to second state 35*b*. A second transition 32 may transition the mode of operation of portable carbonation system 100 (shown in at least FIG. 1) from second state 35*b* to first state 35*a*. First transition 31 may occur responsive to detection of a first type of detection. Second transition 32 may occur automatically, e.g., after completion of a first carbonation operation.

Figure 3B:
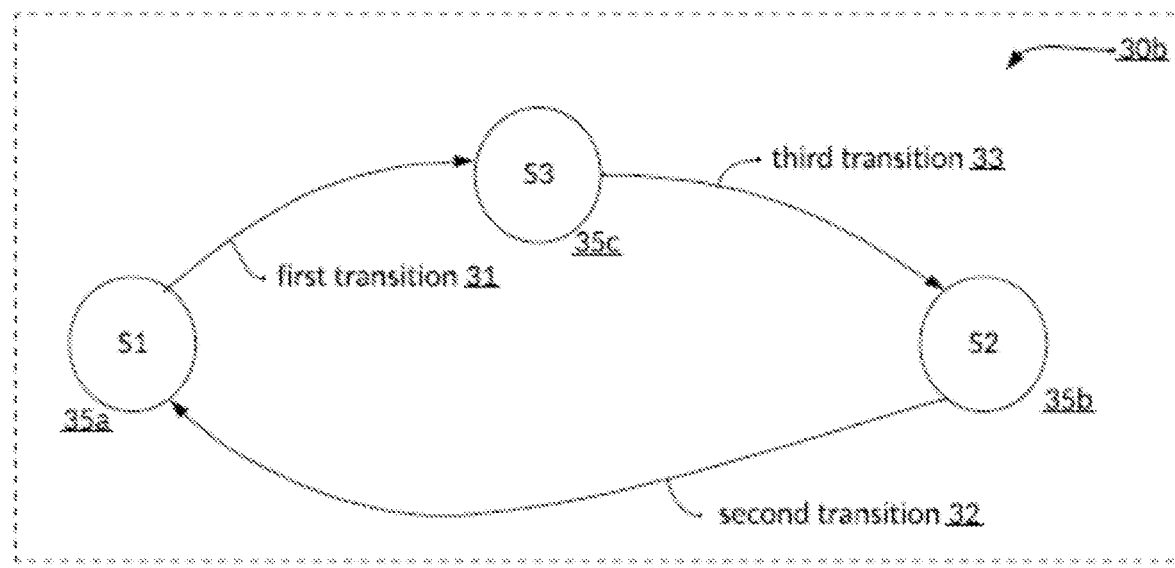

By way of non-limiting example, FIG. 3B illustrates state transitions in a state diagram 30*b* as may be used by portable carbonation system 100 (shown in at least FIG. 1). For example, FIG. 3B may represent state transitions as may be used by portable carbonation system 100 (shown in at least FIG. 1) responsive to different types of detections regarding control interface 19 being manipulated by a user as described elsewhere in this disclosure. As depicted, state diagram 30*b* may include a first state 35*a* (labeled "S1"), a second state 35*b* (labeled "S2"), and a third state 35*c* (labeled "S3"). First state 35*a* may be similar as described regarding FIG. 3A. Second state 35*b* may correspond to a warning mode of operation of portable carbonation system 100. Third state 35*c* may correspond to a carbonation mode of operation of portable carbonation system 100 (shown in at least FIG. 1). As depicted in state diagram 30*b*, a first transition 31 may transition the mode of operation of portable carbonation system 100 (shown in at least FIG. 1) from first state 35*a* to third state 35*c*. A second transition 32 may transition the mode of operation of portable carbonation system 100 (shown in at least FIG. 1) from second state 35*b* to first state 35*a*. A third transition 33 may transition the mode of operation of portable carbonation system 100 (shown in at least FIG. 1) from third state 35*c* to second state 35*b*. First transition 31 may occur responsive to detection of a particular type of detection. Third transition 33 may occur responsive to detection of an error condition. Second transition 32 may occur automatically, or after the error condition has been addressed.

Figure 3C:
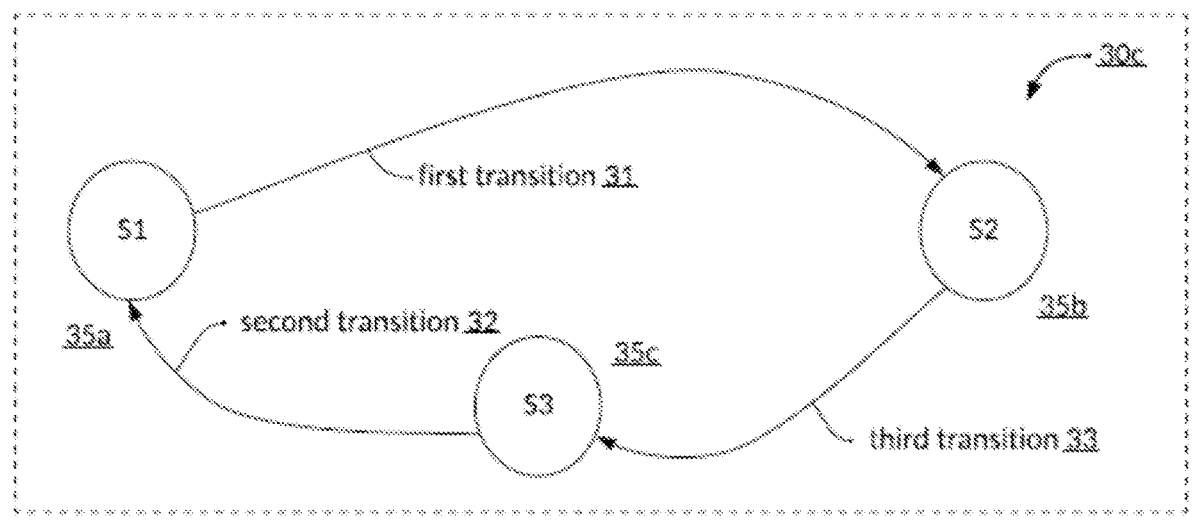

By way of non-limiting example, FIG. 3C illustrates state transitions in a state diagram 30*c* as may be used by portable carbonation system 100 (shown in at least FIG. 1). For example, FIG. 3C may represent state transitions as may be used by portable carbonation system 100 (shown in at least FIG. 1) responsive to different types of detections regarding control interface 19 being manipulated by a user as described elsewhere in this disclosure. As depicted, state diagram 30*c* may include a first state 35*a* (labeled "S1"), a second state 35*b* (labeled "S2"), and a third state 35*c* (labeled "S3"). First state 35*a* may correspond to a carbonation mode of operation. Second state 35*b* may correspond to a different mode of operation of portable carbonation system 100 (shown in at least FIG. 1) in which the user can interact with and/or modify settings of portable carbonation system 100 (shown in at least FIG. 1). Third state 35*c* may correspond to a warning or error mode of operation of portable carbonation system 100 (shown in at least FIG. 1). As depicted in state diagram 30*c*, a first transition 31 may transition the mode of operation of portable carbonation system 100 (shown in at least FIG. 1) from first state 35*a* to second state 35*b*. A second transition 32 may transition the mode of operation of portable carbonation system 100 (shown in at least FIG. 1) back to first state 35*a*. A third transition 33 may transition the mode of operation of portable carbonation system 100 (shown in at least FIG. 1) from first state 35*a* to third state 35*c*. Different transitions may occur responsive to particular types of detections or errors.

Figure 3D:
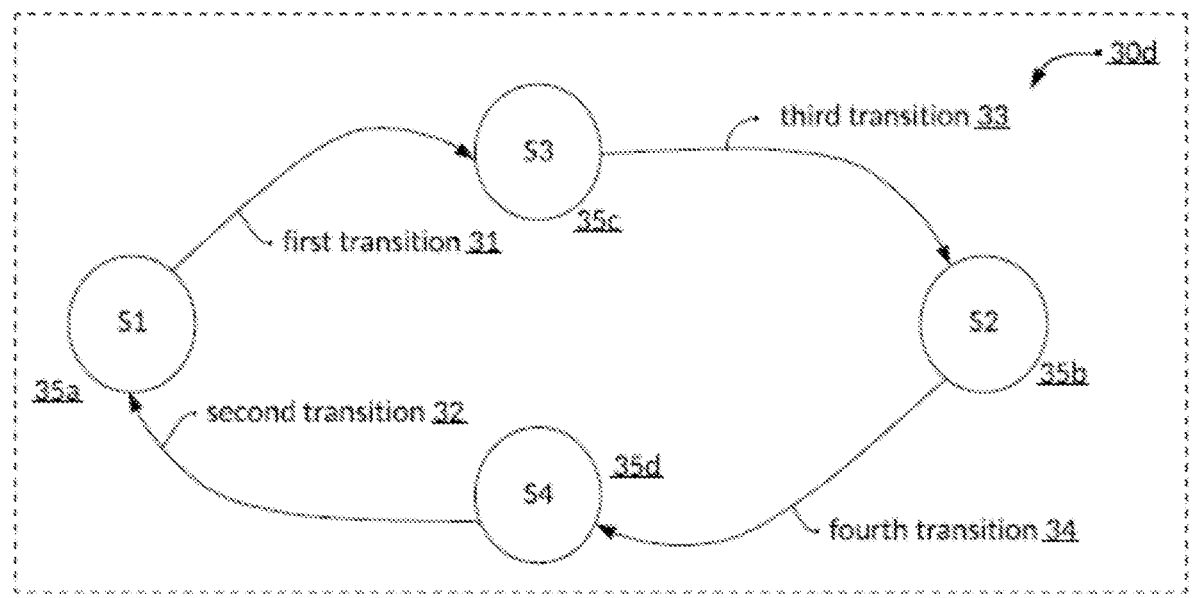

By way of non-limiting example, FIG. 3D illustrates state transitions in a state diagram 30*d* as may be used by portable carbonation system 100 (shown in at least FIG. 1). For example, FIG. 3D may represent state transitions as may be used by portable carbonation system 100 (shown in at least FIG. 1) responsive to different types of detections regarding control interface 19 being manipulated by a user as described elsewhere in this disclosure. As depicted, state diagram 30*d* may include a first state 35*a* (labeled "S1"), a second state 35*b* (labeled "S2"), a third state 35*c* (labeled "S3"), and a fourth state 35*d* (labeled "S4"). Multiple depicted states may correspond to different modes of operation or error. At least one of the depicted states may correspond to a carbonation mode of operation. Different states may correspond to different information being presented through control interface 19. Different transitions may affect both the depicted states and the presented information, including warnings.

Figure 6:
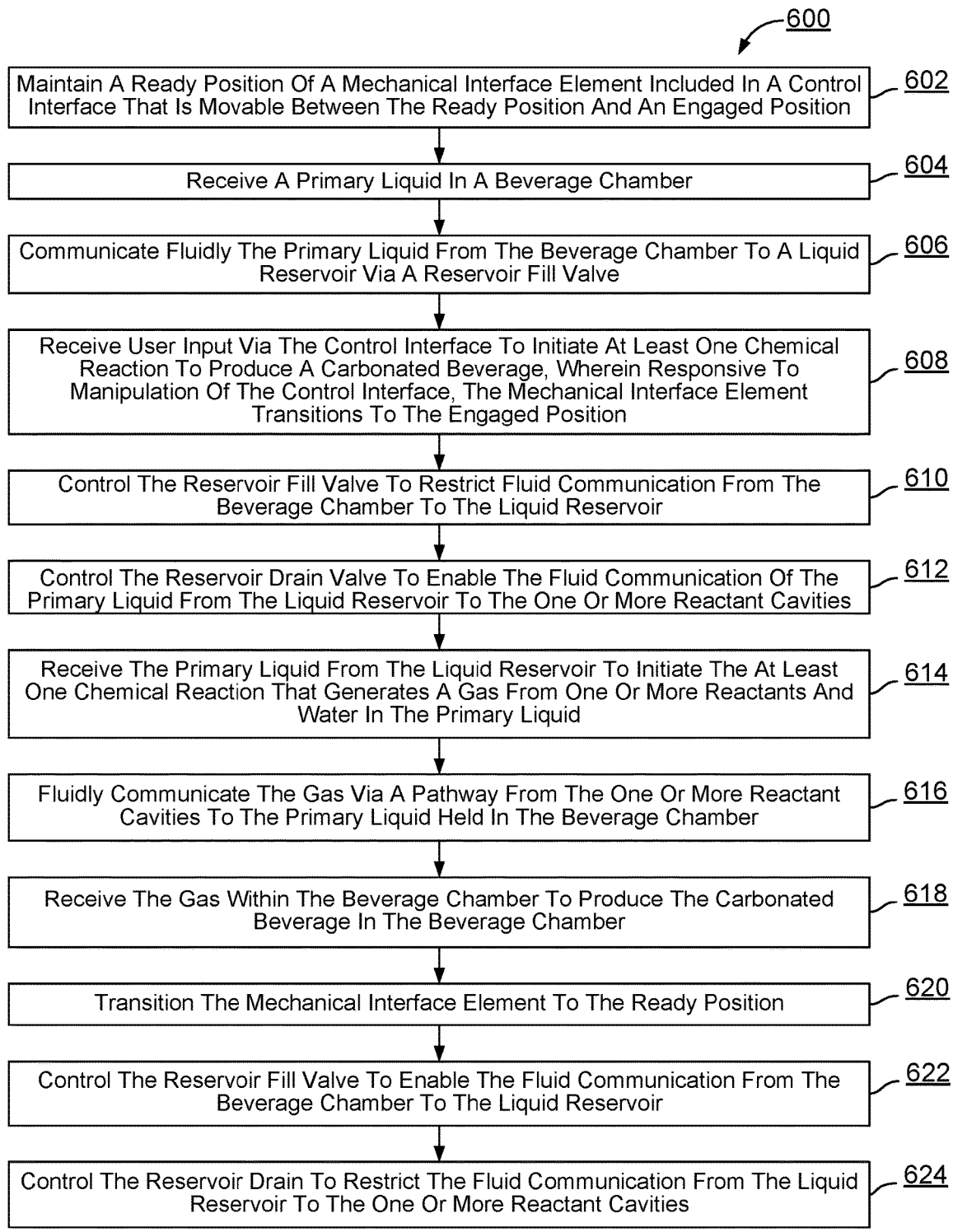
FIG. 6 shows a method of producing a carbonated beverage in a portable carbonation system, in accordance with one or more implementations.

FIG. 6 illustrates a method 600 of producing a carbonated beverage from a primary liquid through at least one chemical reaction, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

An operation 602, a ready position of a mechanical interface element is maintained. The mechanical interface element is included in the control interface. The mechanical interface element is movable between the ready position and an engaged position. In some embodiments, operation 602 is performed by a control interface the same as or similar to control interface 19 (shown in FIG. 1 and described herein).

At an operation 604, the primary liquid is received in the beverage chamber, such that the beverage chamber contains the primary liquid. In some embodiments, operation 604 is performed by a beverage chamber the same as or similar to beverage chamber 21 (shown in FIG. 1 and described herein).

At an operation 606, the primary liquid is communicated fluidly from the beverage chamber to the liquid reservoir via the reservoir fill valve. In some embodiments, operation 606 is performed by a reservoir fill valve the same as or similar to reservoir fill valve 14 (shown in FIG. 1 and described herein).

At an operation 608, user input is received from a user via the control interface to initiate the at least one chemical reaction to produce the carbonated beverage. The user input includes manipulation of the control interface. Responsive to the manipulation of the control interface, the mechanical interface element transitions from the ready position to the engaged position. In some embodiments, operation 608 is performed by a control interface the same as or similar to control interface 19 (shown in FIG. 1 and described herein).

At an operation 610, the reservoir fill valve is controlled, subsequent to receiving the user input, such that the fluid communication of the primary liquid from the beverage chamber to the liquid reservoir is restricted. In some embodiments, operation 610 is performed by a reservoir fill valve the same as or similar to reservoir fill valve 14 (shown in FIG. 1 and described herein).

At an operation 612, the reservoir drain valve is controlled, subsequent to receiving the user input, such that the fluid communication of the primary liquid from the liquid reservoir to one or more reactant cavities is enabled. In some embodiments, operation 612 is performed by a reservoir drain valve the same as or similar to reservoir drain valve 22 (shown in FIG. 1 and described herein).

At an operation 614, the primary liquid is received, at the one or more reactant cavities, from the liquid reservoir, such that the primary liquid at the one or more reactant cavities initiates the at least one chemical reaction. The at least one chemical reaction generates a gas from the one or more reactants and water in the primary liquid. In some embodiments, operation 614 is performed by one or more reactant cavities the same as or similar to one or more reactant cavities 13 (shown in FIG. 1 and described herein).

At an operation 616, the gas is communicated fluidly via a pathway from the one or more reactant cavities to the primary liquid held in the beverage chamber. In some embodiments, operation 616 is performed by a pathway the same as or similar to pathway 16 (shown in FIG. 1 and described herein).

At an operation 618, the gas is received within the beverage chamber that contains the primary liquid, such that the gas within the beverage chamber produces the carbonated beverage in the beverage chamber. In some embodiments, operation 618 is performed by a beverage chamber the same as or similar to beverage chamber 21 (shown in FIG. 1 and described herein).

At an operation 620, the mechanical interface element is transitioned from the engaged position to the ready position. In some embodiments, operation 620 is performed by a control interface the same as or similar to control interface 19 (shown in FIG. 1 and described herein).

At an operation 622, the reservoir fill valve is controlled such that the fluid communication from the beverage chamber to the liquid reservoir is enabled, and. In some embodiments, operation 622 is performed by a reservoir fill valve the same as or similar to reservoir fill valve 14 (shown in FIG. 1 and described herein).

At an operation 624, the reservoir drain valve is controlled such that the fluid communication from the liquid reservoir to the one or more reactant cavities is restricted. In some embodiments, operation 624 is performed by a reservoir drain valve the same as or similar to reservoir drain valve 22 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of producing a carbonated beverage from a primary liquid through at least one chemical reaction, the method being implemented in a carbonation device that includes a base assembly, a beverage chamber that contains the primary liquid, a liquid reservoir positioned within the base assembly, a control interface, a reservoir fill valve that controls fluid communication of the primary liquid from the beverage chamber to the liquid reservoir, and a reservoir drain valve that controls fluid communication of the primary liquid from the liquid reservoir to one or more reactant cavities within the base assembly that hold one or more reactants, the method comprising:

maintaining a ready position of a mechanical interface element, wherein the mechanical interface element is included in the control interface, wherein the mechanical interface element is movable between the ready position and an engaged position;

receiving the primary liquid in the beverage chamber, such that the beverage chamber contains the primary liquid;

communicating fluidly the primary liquid from the beverage chamber to the liquid reservoir via the reservoir fill valve;

receiving user input from a user via the control interface to initiate the at least one chemical reaction to produce the carbonated beverage, wherein the user input includes manipulation of the control interface, wherein responsive to the manipulation of the control interface, the mechanical interface element transitions from the ready position to the engaged position;

controlling the reservoir fill valve, subsequent to receiving the user input, such that the fluid communication of the primary liquid from the beverage chamber to the liquid reservoir is restricted;

controlling the reservoir drain valve, subsequent to receiving the user input, such that the fluid communication of the primary liquid from the liquid reservoir to the one or more reactant cavities is enabled;

receiving, at the one or more reactant cavities, the primary liquid from the liquid reservoir, such that the primary liquid at the one or more reactant cavities initiates the at least one chemical reaction, wherein the at least one chemical reaction generates a gas from the one or more reactants and water in the primary liquid;

fluidly communicating the gas via a pathway from the one or more reactant cavities to the primary liquid held in the beverage chamber;

receiving the gas within the beverage chamber that contains the primary liquid, such that the gas within the beverage chamber produces the carbonated beverage in the beverage chamber; and transitioning the mechanical interface element from the engaged position to the ready position;

controlling the reservoir fill valve such that the fluid communication from the beverage chamber to the liquid reservoir is enabled, and controlling the reservoir drain valve such that the fluid communication from the liquid reservoir to the one or more reactant cavities is restricted.

2. The method of claim 1, wherein the reservoir fill valve is temporarily restricted due to the mechanical interface element being in the engaged position.

3. The method of claim 1, wherein the reservoir fill valve is controlled such that the fluid communication of the primary liquid from the beverage chamber to the liquid reservoir is enabled, responsive to the mechanical interface element transitioning from the engaged position to the ready position.

4. The method of claim 1, wherein the reservoir drain valve is controlled such that the fluid communication of the primary liquid from the liquid reservoir to the one or more reactant cavities is restricted, responsive to the mechanical interface element transitioning from the engaged position to the ready position.

5. The method of claim 1, wherein the manipulation of the carbonation device such that the mechanical interface element transitions from the engaged position to the ready position includes opening the base assembly to expose the one or more reactant cavities.

6. The method of claim 5, further comprising:
receiving the one or more reactants in the one or more reactant cavities, subsequent to the base assembly opening to expose the one or more reactant cavities.

7. The method of claim 5, wherein opening the base assembly includes disengaging one or more mechanical couplings included in the base assembly.

8. The method of claim 1, wherein the reservoir fill valve is controlled such that the fluid communication of the primary liquid from the beverage chamber to the liquid reservoir is enabled, responsive to the mechanical interface element being in the ready position.

9. The method of claim 1, wherein transitioning the mechanical interface element from the engaged position to the ready position is powered by a spring.

10. The method of claim 1, wherein the fluid communication of the gas through the pathway is powered at least in part by a pressure differential.

11. A portable carbonation device configured to produce a carbonated beverage from a primary liquid through at least one chemical reaction, the portable carbonation device comprising:

a base assembly including a liquid reservoir, one or more reactant cavities, and a control interface, wherein the control interface is configured to receive user input from a user to initiate the at least one chemical reaction, wherein the control interface includes a mechanical interface element configured to move between a ready position and an engaged position;

a beverage chamber configured to receive the primary liquid;

a reservoir fill valve configured to control fluid communication of the primary liquid from the beverage chamber to the liquid reservoir, wherein responsive to the receipt of the user input the mechanical interface element transitions from the ready position to the engaged position and the reservoir fill valve is configured to restrict the fluid communication to the liquid reservoir;

a reservoir drain valve configured to control fluid communication from the liquid reservoir to the one or more reactant cavities, wherein responsive to the receipt of the user input the reservoir drain valve is configured to enable the fluid communication to the one or more reactant cavities; and the one or more reactant cavities configured to hold one or more reactants, wherein the one or more reactant cavities are further configured to receive the primary liquid from the liquid reservoir via the reservoir drain valve, wherein the at least one chemical reaction is initiated responsive to the primary liquid being received at the one or more reactant cavities, and wherein the at least one chemical reaction generates a gas from the one or more reactants and water in the primary liquid; and a pathway for fluid communication of the gas from the one or more reactant cavities to the primary liquid held in the beverage chamber, such that the gas within the beverage chamber produces the carbonated beverage in the beverage chamber, wherein the portable carbonation device is further configured to:
(i) facilitate a manipulation of the portable carbonation device such that the mechanical interface element transitions from the engaged position to the ready position,
(ii) control the reservoir fill valve such that the fluid communication from the beverage chamber to the liquid reservoir is enabled, and
(iii) control the reservoir drain valve such that the fluid communication from the liquid reservoir to the one or more reactant cavities is restricted.

12. The portable carbonation system of claim 11, wherein the reservoir fill valve is temporarily restricted due to the mechanical interface element being in the engaged position.

13. The portable carbonation system of claim 11, wherein the reservoir fill valve is controlled such that the fluid communication of the primary liquid from the beverage chamber to the liquid reservoir is enabled, responsive to the mechanical interface element transitioning from the engaged position to the ready position.

14. The portable carbonation system of claim 11, wherein the reservoir drain valve is controlled such that the fluid communication of the primary liquid from the liquid reservoir to the one or more reactant cavities is restricted, responsive to the mechanical interface element transitioning from the engaged position to the ready position.

15. The portable carbonation system of claim 11, wherein the manipulation of the portable carbonation device such that the mechanical interface element transitions from the engaged position to the ready position includes opening the base assembly to expose the one or more reactant cavities.

16. The portable carbonation system of claim 15, wherein, subsequent to the base assembly opening to expose the one or more reactant cavities, the one or more reactant cavities are configured to receive the one or more reactants.

17. The portable carbonation system of claim 15, wherein opening the base assembly includes disengaging one or more mechanical couplings included in the base assembly.

18. The portable carbonation system of claim 11, wherein the reservoir fill valve is controlled such that the fluid communication of the primary liquid from the beverage chamber to the liquid reservoir is enabled, responsive to the mechanical interface element being in the ready position.

19. The portable carbonation system of claim 11, wherein transitioning the mechanical interface element from the engaged position to the ready position is powered by a spring.

20. The portable carbonation system of claim 11, wherein the fluid communication of the gas through the pathway is powered at least in part by a pressure differential.

* * * * *